No. 765,211. Patented July 19, 1904.

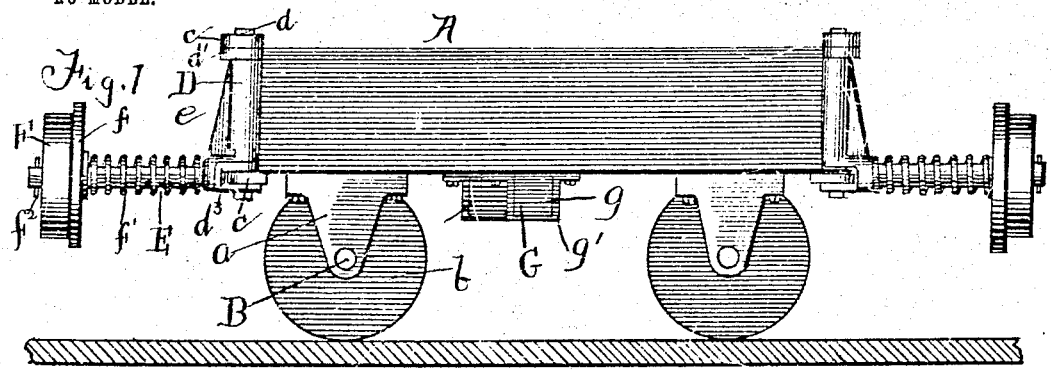
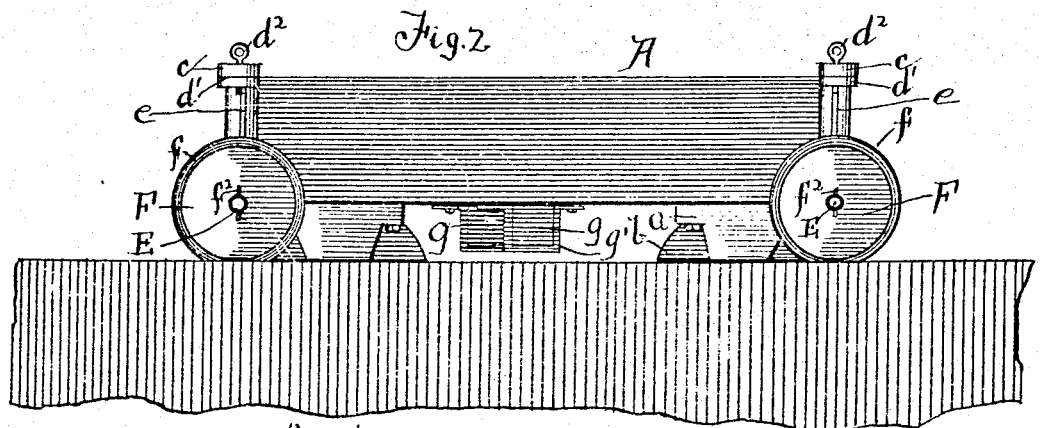
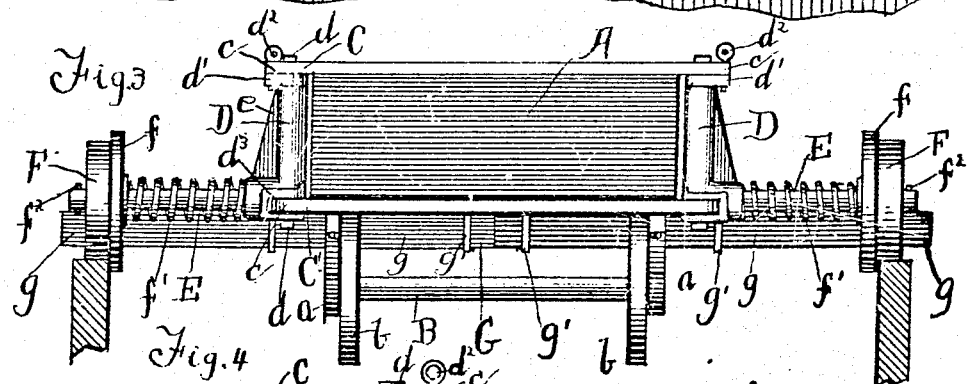
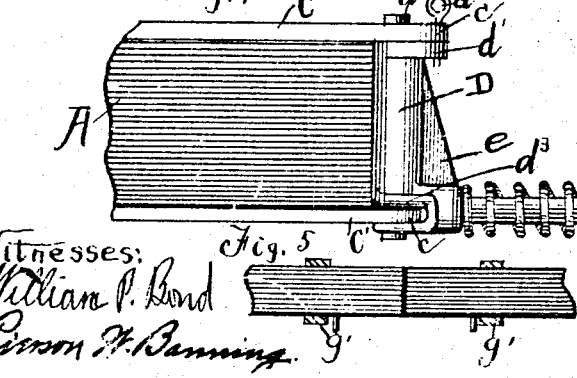

UNITED STATES PATENT OFFICE.

FRANK THOMPSON, OF CHICAGO, ILLINOIS, ASSIGNOR TO UNITED SUPPLY & MANUFACTURING COMPANY, OF CHICAGO, ILLINOIS, A CORPORATION OF ILLINOIS.

TRUCK.

SPECIFICATION forming part of Letters Patent No. 765,211, dated July 19, 1904.

Application filed February 15, 1904. Serial No. 193,630. (No model.)

*To all whom it may concern:*

Be it known that I, FRANK THOMPSON, a citizen of the United States, residing at Chicago, in the county of Cook and State of Illinois, have invented certain new and useful Improvements in Trucks, of which the following is a specification.

The object of this invention is to provide a truck especially adapted for use with hoisting or other machinery on board cars, and the truck is so arranged and mounted that it may be used to travel along flat-cars or coal-cars, as may be desired, it being so arranged that it can be moved along the floor of a car or along the top edges of a coal-car when it is desirable to use it in the latter capacity.

The invention more particularly relates to the mounting and arrangement of a series of auxiliary wheels which may be employed when the truck is mounted upon a coal-car and which may be disconnected and turned out of the road when the truck is to be used on a flat-car.

Although the truck is primarily intended to serve as a movable base or support for the mounting of a derrick or other hoisting machinery adapted for the loading and unloading of cars, it may be used in any capacity in which it is desirable to provide an auxiliary mounting for the truck.

The invention further relates to the means employed for adapting a truck for use on coal-cars of varying widths and to the means by which a firm and secure support is provided under all circumstances.

In the drawings illustrating the invention, Figure 1 is a side elevation of the truck mounted upon an ordinary flat-car; Fig. 2, a side elevation of the truck mounted upon the sides of a coal-car; Fig. 3, an end elevation of the truck as employed in Fig. 2; Fig. 4, a detail of the mounting for the auxiliary wheels, and Fig. 5 a detail of the bars employed to prevent accident to the truck when employed as in Figs. 2 and 3.

The truck is constructed in any ordinary and well-known manner to have a body portion A adapted for the mounting of a truck or other hoisting apparatus, and said body is provided with pedestals $a$, suitably secured to the bottom of the body, and said pedestals are provided with journals B, upon which are mounted wheels $b$, which are preferably without flanges, and said wheels are employed to support the truck when the latter is employed upon a train composed of flat-cars, thereby enabling the truck to be moved from end to end of a flat-car when in operation.

At the ends of the truck are arranged a pair of transversely-extending bars C and C', the former being secured to the top of the truck and the latter to the bottom of the truck immediately beneath, and said bars are of a length to project laterally and terminate in supporting-ears $c$ at the top and bottom. Between the ears at the four corners of the car are a series of supporting-sockets D, which are pivoted between the ears by means of a pivot $d$, adapting the sockets to turn or swing between the ears, and each of the sockets is provided at the top with a lug $d'$, which when the parts are in the relation shown in Fig. 3 coincides with the end of the ear with which it coöperates. The parts are held in the position shown in Fig. 3 by means of a pin $d^2$, which passes through the ear and lug and locks the parts in place. Each of the sockets terminates at its lower end in the jaws $d^3$, having an opening between them of sufficient width to straddle the end of the lower ear, and to the jaws is rigidly secured an outwardly-projecting journal E, which is preferably formed integral with the socket and adapted to swing therewith. The sockets are reinforced by means of outwardly-turned ribs $e$, which bridge the angle between the sleeve portion and the jaws, thereby rigidly securing the parts and enabling them to withstand a great strain. Each of the journals is provided on its outer end with a wheel F, provided on its inner edge with a flange $f$, adapted to contact the inner upper edge of the side of the coal-car, which arrangement adapts the truck for use on coal-cars, and when so used the supporting-wheels $b$ will be raised above the floor of the coal-car, allowing the entire truck to travel along the top of the car. Between the wheels F and the jaws of the sockets are springs $f'$, which bear against the wheels and cause the flanges to closely contact the walls of the car, since the wheels are loosely mounted upon their journals and are adapted to be compressed or forced out. The arrangement enables the truck to be mounted upon cars of varying width, which is a feature of great importance in the art to which the present invention relates. The wheels are prevented from being forced off of their journals by the tension of the springs by means of a series of pins $f^2$, although it is obvious that other means may be provided to secure this result.

In order to obviate the danger of a breakdown of any of the parts, a sectional beam G is employed and is composed of two sections $g$, slidably mounted within hangers or sockets $g'$, which enables the sections of the bottom to be extended, as shown in Fig. 3, so as to bridge the distance across the top of the coal-car or to be forced back under the body of the truck when it is desirable to use the truck upon a flat-car.

In use when the truck is employed upon a coal-car the sockets and wheels carried thereby are swung out into the position shown in Fig. 3 and the pins $d^2$ dropped into place and the sections of the beam drawn out, and when the truck is so arranged it will move freely from end to end of and be supported by the walls of the coal-car, and the sections of the beam will prevent damage to the truck and the mechanism carried thereby in case the supporting-wheels should for any reason slip from their position, thereby supporting the truck on the beam and preventing it from falling to the bottom of the car. When, however, it is desirable to use the truck on a flat-car, the pins are withdrawn and the sockets swung around into position (shown in Fig. 1) and the sections of the beam pushed back under the body of the truck, thereby throwing the parts out of the way and enabling the truck to be supported by and moved along the bottom of a flat-car.

The arrangement is one that is extremely advantageous for use on trains in that it adapts the truck for use under all circumstances and enables the rails or other freight to be loaded and unloaded from coal-cars with the same ease and facility with which they may be manipulated on flat-cars.

What I regard as new, and desire to secure by Letters Patent, is—

1. In a truck, the combination of a body portion, a series of sockets pivotally mounted on the body portion, journals carried by the sockets and adapted to be swung into a position transverse to the body of the truck and to be swung out of such position, wheels carried by the journals for supporting the truck when the journals are in transverse relation, and springs carried by the journals and adapted to bear against the wheels, substantially as described.

2. In a truck, the combination of a body, ears at the corners of the body, vertical sockets pivotally mounted between the ears, outwardly-projecting journals carried by the sockets and adapted to be swung into transverse relation to the body and adapted to be swung out of such relation, and pins passing through the ears and into the sockets and adapted to lock the parts when the journals are in transverse relation to the body, substantially as described.

3. In a truck, the combination of a body, ears at the corners of the body, sockets pivotally mounted between the ears, journals carried by the sockets and adapted to be swung into transverse relation to the body and adapted to be swung out of such relation, pins passing through the ears and into the sockets and adapted to lock the parts when the journals are in transverse relation to the body, and springs on the journals adapted to bear against the wheels, substantially as described.

4. In a truck, the combination of a body, ears at the corners of the body, sockets pivotally mounted between the ears, journals carried by the sockets and adapted to be swung into transverse relation to the body and adapted to be swung out of such relation, pins passing through the ears and into the sockets and adapted to lock the parts when the journals are in transverse relation to the body, and a bar extending transversely across the body of the truck in line with the wheels when in transverse relation, substantially as described.

5. In a truck, the combination of a body provided with wheels adapted to travel along the floor of a car, and further provided with four outwardly-projecting journals pivotally mounted to the body and adapted to be swung into transverse relation thereto, and out of transverse relation, and wheels rotatably mounted on the pivoted journals and adapted to support the truck on the top of the car, substantially as described.

6. In a truck, the combination of a body mounted upon wheels, sockets pivotally mounted on the body, journals carried by the sockets, wheels rotatably mounted on the journals, and springs mounted on the journals with and adapted to bear against the wheels thereon, substantially as described.

7. In a truck, the combination of a body provided with transversely-extending upper and lower bars arranged in line with one another at the ends of the truck, said bars being of a length to project beyond the sides of the truck, sockets pivotally mounted between the projecting portions, each of the sockets being provided with a lug at its upper end, removable pins adapted to pass through the projecting portions of the upper bars, and lugs on the sockets to lock the same, jaws at the lower ends of the sockets adapted to straddle the ends of the transversely-extending lower
5 bars, outwardly-projecting journals carried by the sockets, flanged wheels revolubly mounted on the journals, and springs adapted to bear against the wheels, substantially as described.

FRANK THOMPSON.

Witnesses:
P. B. JAMES,
O. M. CARRY.